United States Patent
Fujita et al.

(10) Patent No.: US 8,306,775 B2
(45) Date of Patent: Nov. 6, 2012

(54) APPARATUS, METHOD, AND PROGRAM FOR DETECTING ROTATION SPEED INFORMATION, AND APPARATUS, METHOD, AND, PROGRAM FOR DETECTING TIRE HAVING DECREASED PRESSURE

(75) Inventors: Hajime Fujita, Nishinomiya (JP); Hiroaki Kawasaki, Ashiya (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 438 days.

(21) Appl. No.: 12/652,228

(22) Filed: Jan. 5, 2010

(65) Prior Publication Data
US 2010/0217542 A1 Aug. 26, 2010

(30) Foreign Application Priority Data
Feb. 25, 2009 (JP) .................. 2009-042974

(51) Int. Cl.
- G01P 3/487 (2006.01)
- G06M 15/00 (2011.01)
- G06F 19/00 (2006.01)

(52) U.S. Cl. .............. 702/145; 73/146.2; 73/514.39; 324/166; 324/179; 340/442; 340/626; 340/671; 377/20; 702/1; 702/127; 702/189; 708/200

(58) Field of Classification Search .............. 73/146, 73/146.2, 488, 514.39; 324/160, 163, 166, 324/167, 187, 179, 200, 226, 178; 340/425.5, 340/439, 441, 442, 443, 500, 540, 603, 626, 340/670, 671; 377/1, 19, 20; 702/1, 127, 702/138, 140, 142, 145, 189; 708/100, 105, 708/200

See application file for complete search history.

(56) References Cited

U.S. PATENT DOCUMENTS
2,738,461 A * 3/1956 Burbeck et al. .............. 368/119
(Continued)

FOREIGN PATENT DOCUMENTS
EP 0506399 A1 * 9/1992
(Continued)

OTHER PUBLICATIONS

Persson, N., "Event Based Sampling with Application to Spectral Estimation", Ph.D. thesis No. 981, Division of Control and Communication, Department of Electrical Engineering Linkopings University, 2002, pp. 39-50.

(Continued)

*Primary Examiner* — Edward Cosimano
(74) *Attorney, Agent, or Firm* — Birch, Stewart, Kolasch & Birch, LLP

(57) ABSTRACT

A rotation speed information detection apparatus, including: a wheel sensor for detecting passage of teeth of a gear provided in association with tires of a vehicle; a number-of-teeth calculation means for calculating the number of teeth of the gear passed per a sampling cycle set in advance; and a wheel speed calculation means for regularly calculating rotation speed information of the tire with using the number of teeth calculated. The number-of-teeth calculation means is configured to use a ratio between time information at the point and a remaining time until the time at which the next sampling cycle is started is reached to thereby calculate the number of remaining teeth to calculate the number of teeth passed during the sampling cycle. The wheel speed calculation means is configured to calculate tire rotation speed information based on an interval between neighboring teeth in the gear, the number of teeth passed during the sampling cycle, the number of remaining teeth calculated by the number-of-teeth-calculation means, and the sampling cycle.

8 Claims, 11 Drawing Sheets

U.S. PATENT DOCUMENTS

| | | | | |
|---|---|---|---|---|
| 2,831,162 | A * | 4/1958 | Gross | 368/118 |
| 3,267,372 | A * | 8/1966 | Langheinrich et al. | 324/166 |
| 3,465,326 | A * | 9/1969 | Weir et al. | 340/671 |
| 3,541,448 | A * | 11/1970 | Nutt | 368/118 |
| 4,001,687 | A * | 1/1977 | Sorkin et al. | 324/173 |
| 4,055,993 | A * | 11/1977 | Rackliffe et al. | 73/114.25 |
| 4,162,443 | A | 7/1979 | Brearley et al. | |
| 4,180,753 | A * | 12/1979 | Cook, II | 310/168 |
| 4,199,719 | A * | 4/1980 | Grob | 324/166 |
| 4,224,568 | A | 9/1980 | Griner | |
| 4,303,983 | A * | 12/1981 | Chaborski | 702/176 |
| 4,786,861 | A | 11/1988 | Hulsing, II et al. | |
| 4,799,178 | A * | 1/1989 | Spadafora et al. | 702/146 |
| 4,977,525 | A * | 12/1990 | Blackwell | 702/146 |
| 5,165,271 | A * | 11/1992 | Stepper et al. | 73/114.27 |
| 5,606,122 | A * | 2/1997 | Taguchi et al. | 73/146.2 |
| 6,092,028 | A * | 7/2000 | Naito et al. | 702/47 |
| 6,892,130 | B2 * | 5/2005 | Bohnig et al. | 701/110 |
| 7,096,136 | B2 * | 8/2006 | Bohnig et al. | 702/96 |
| 7,240,542 | B2 * | 7/2007 | Gustafsson et al. | 73/146 |
| 7,289,932 | B2 * | 10/2007 | Woody | 702/163 |
| 7,963,157 | B2 * | 6/2011 | Kawasaki et al. | 73/146.5 |
| 8,207,839 | B2 * | 6/2012 | Fujita et al. | 340/443 |
| 2003/0172728 | A1 * | 9/2003 | Gustafsson et al. | 73/146 |
| 2004/0163469 | A1 * | 8/2004 | Bohnig et al. | 73/488 |
| 2004/0167703 | A1 * | 8/2004 | Bohnig et al. | 701/101 |
| 2006/0111867 | A1 * | 5/2006 | Woody | 702/163 |
| 2009/0282906 | A1 * | 11/2009 | Kawasaki et al. | 73/146.5 |
| 2010/0013616 | A1 * | 1/2010 | Fujita et al. | 340/443 |
| 2010/0013617 | A1 * | 1/2010 | Fujita et al. | 340/443 |
| 2010/0225463 | A1 * | 9/2010 | Fujita et al. | 340/443 |
| 2011/0107828 | A1 * | 5/2011 | Kawasaki | 73/146.2 |

FOREIGN PATENT DOCUMENTS

| | | | |
|---|---|---|---|
| EP | 0663595 | A2 * | 2/1997 |
| EP | 2130693 | A1 * | 12/2009 |
| EP | 2145779 | A1 * | 1/2010 |
| EP | 2147808 | A2 * | 1/2010 |
| EP | 2224250 | A1 * | 9/2010 |
| EP | 2226206 | A2 * | 9/2010 |
| JP | 06-93920 | A * | 4/1994 |
| JP | 6-297921 | A | 10/1994 |
| JP | 9-323515 | A | 12/1997 |
| JP | 10-54838 | A | 2/1998 |
| JP | 3152151 | B2 | 4/2001 |
| JP | 3289384 | B2 | 6/2002 |
| JP | 2003-130885 | A | 5/2003 |
| JP | 2009-274639 | A * | 11/2009 |
| JP | 2010-23546 | A * | 2/2010 |
| JP | 2010-23673 | A * | 2/2010 |
| JP | 2010-195346 | A * | 9/2010 |
| JP | 2010-197238 | A * | 9/2010 |
| JP | 2010-210262 | A * | 9/2010 |
| JP | 2010-102074 | A * | 5/2011 |
| JP | 2010-102077 | A * | 5/2011 |
| JP | 2011-093353 | A * | 5/2011 |

OTHER PUBLICATIONS

Extended European Search Report dated Jun. 21, 2010 for European Application No. 10001111.3.

* cited by examiner

At low speed

At high speed

A number-of teeth calculation step: using, when an accumulated value of the time information at a sampling cycle exceeds the time at which the next sampling cycle is started, a ratio between time information at the point / an average time information value, and a remaining time until the time at which the next sampling cycle is started is reached to thereby calculate the number of remaining teeth until the time at which the next sampling cycle is started is reached to calculate the number of teeth passed during the sampling cycle

A wheel speed calculation step: calculating tire rotation speed information based on an interval between neighboring teeth in the gear, the number of teeth passed during the sampling cycle, the number of remaining teeth calculated by the number-of-teeth-calculation step, and the sampling cycle

A frequency characteristic estimate step: estimating, based on the rotation speed information obtained by the wheel speed calculation step, a frequency characteristic of the rotation speed information, including a parameter estimation step of estimating parameters of a linear model with regard to a time-series signal including the rotation speed information

A determination step: determining a decrease in the tire air pressure based on the estimated frequency characteristic

*FIG. 11*

APPARATUS, METHOD, AND PROGRAM FOR DETECTING ROTATION SPEED INFORMATION, AND APPARATUS, METHOD, AND, PROGRAM FOR DETECTING TIRE HAVING DECREASED PRESSURE

TECHNICAL FIELD

The present invention relates to an apparatus, a method, and a program for detecting tire rotation speed information used for an apparatus or a method for detecting a tire having a decreased pressure for detecting, based on a resonance frequency of a tire of a running vehicle, a decrease in air pressure of a tire, and an apparatus, a method, and a program for detecting a tire having a decreased pressure using them.

BACKGROUND ART

One of factors required to allow an automobile to run safely is a tire air pressure. When the air pressure is lower than an appropriate value, the stable maneuverability or fuel consumption is deteriorated, which may cause a tire burst. Thus, Tire Pressure Monitoring System (TPMS) for detecting a tire having a decreased pressure to send an alarm to the driver to prompt an appropriate action is an important technique from the viewpoint of environment protection and driver safety.

A conventional alarm apparatus can be classified into two types of the direct detection-type one (direct TPMS) and the indirect detection-type one (indirect TPMS). The direct TPMS provides a pressure sensor in a tire wheel to thereby directly measure the tire pressure. The direct TPMS can detect a decrease in the pressure at a high accuracy but requires exclusive wheels and has a problematic fault-tolerance performance in an actual environment for example. Thus, the direct TPMS is still disadvantageous in the technical and cost aspects.

On the other hand, the indirect TPMS is a method of estimating the air pressure based on the tire rotation information. The indirect TPMS can be further classified into the Dynamic Loaded Radius (DLR) method and the Resonance Frequency Mechanism (RFM) method. The DLR method is a method that uses a phenomenon according to which a tire having a decreased pressure in a running vehicle is collapsed and thus the tire has a reduced dynamic loaded radius and is consequently rotated at a higher speed than other tires having a normal pressure. The DLR method compares the rotation speeds of the four tires to thereby detect a tire having a decreased pressure. Since this method can use only wheel rotation speed signals obtained from a wheel speed sensor to subject the signals to a relatively-easy computation processing, this method has been widely researched mainly for the purpose of detecting a puncture of one wheel. However, this method merely makes a relative comparison among wheel rotation speeds and thus cannot detect a case of four wheels simultaneous deflation (natural leakage). Furthermore, a disadvantage is caused where a decreased pressure cannot be accurately detected through all running conditions because a difference in the wheel speed is also caused by running conditions such as the turning of the vehicle, the acceleration and deceleration, and an eccentric load.

On the other hand, the RFM method is a method to use a fact that a tire having a decreased pressure has a different wheel speed signal frequency characteristic to thereby detect a difference from a normal pressure. In contrast with the DLR method, the RFM method is an absolute comparison with the normal values of the respective wheels that are retained in advance. Thus, the RFM method also can detect a case of four wheels simultaneous deflation. Thus, the RFM method attracts attentions as a better indirect detection method. However, the RFM method has a disadvantage where some running conditions cause strong noise for example and thus an estimated frequency value of a target domain is not robust against the vehicle speed and the road surface situation for example. The present invention relates to an apparatus for detecting a tire status based on the RFM method. Hereinafter, the basic principle of this method will be described in more detail.

When the vehicle is running, the tires receive a force from the road surface to thereby cause the torsional motion in the front-and-rear direction and the front-and-rear motion of the suspension, and these motions have a coupled resonance vibration. Since this resonance phenomenon also has an influence on the wheel rotation motion, a wheel speed signal obtained from a wheel sensor provided in the Anti-Lock Braking System (ABS) also includes information related to the resonance phenomenon. Furthermore, since the coupled resonance vibration is caused in a unique vibration mode due to the tire torsional rigidity, the excitation status thereof changes so as to depend only on a change in the air pressure constituting the tire physical characteristic and has a very small dependence on a change in the vehicle speed and a change in the road surface. Specifically, a decreased air pressure causes a change in the dynamics of the tire torsional motion. Thus, when the wheel speed signal is subjected to a frequency analysis, a peak of the coupled resonance vibration (resonance peak) appears at the lower frequency-side in the case of a decreased pressure than in the case of a normal pressure.

FIG. 3 illustrates the power spectra obtained by attaching tires having a normal air pressure, tires having a 25%-decreased pressure (200 kPa) from the normal pressure (270 kPa), and tires having a 40%-decreased pressure (160 kPa) to a vehicle and subjecting the respective wheel acceleration signals obtained within a fixed time (2 minutes) (which are obtained by calculating a time difference of wheel speed signals) to the Fast Fourier Transform (FFT). In FIG. 3, the horizontal axis shows frequency (Hz) and the vertical axis shows decibel (dB). The data used was obtained by allowing the vehicle to run on a road having a markedly-uneven surface with a speed of 40 km per hour. The components in the vicinity of 20 to 40 Hz show the vibration caused by the resonance between the tire vibration in the front-and-rear direction and the vehicle suspension. It is understood that a change in the internal pressure causes a frequency having a peak value (resonance frequency) to move to a lower frequency. This phenomenon appears, due to the above-described characteristic, to be independent from the tire type and the vehicle type, the running speed, and the road surface situation for example. Thus, the RFM method focuses on this resonance frequency and issues an alarm when the frequency is relatively lower than a reference frequency estimated during initialization. Thus, the resonance frequency must be estimated based on wheel speed signals obtained from the ABS. However, since it is difficult to store time-series data in an in-vehicle calculator having a limited calculation resource, a difficulty is caused in performing the frequency analysis based on FFT. Due to this reason, the conventional method is to describe a resonance phenomenon by a quadratic model to perform a sequential time-series analysis based on an Autoregressive (AR) model (see Patent Literature 1 for example). A frequency corresponding to the pole of a transfer function representing a AR model is estimated as a resonance frequency. Thus, a resonance frequency can be accurately obtained if the resonance peak is correctly extracted by the model.

A wheel speed signal, which is an input of the Tire Pressure Monitoring System based on the RFM method, is calculated based on a time signal called "time stamp" supplied from the ABS. Here, the ABS obtains the time stamp information in the manner as described below. A part at which the vehicle is connected to a tire has a gear associated with the tire. An in-vehicle wheel sensor measures, based on an induction voltage, a change in the magnetic field emitted from a permanent magnet stored therein due to gear rotation. By converting this voltage change to a rectangular wave, the time at which the rising edges of the respective teeth of the gear pass can be measured (see FIG. 4). This passing time is a time stamp based on which the tire wheel speed is calculated.

Specifically, by calculating a difference between the time stamps, the time required for one tooth to pass (hereinafter, this passing time of one tooth is called "time information") can be calculated. Thus, based on this time information and the interval between neighboring teeth (which can be calculated based on a known gear radius), the speed at which the tooth momentarily passes can be calculated. The wheel speed signal obtained by this method can be obtained by a dynamic cycle depending on the vehicle running speed (hereinafter, the speed calculated in the manner as described above will be called "dynamic wheel speed signal"). This is not appropriate for a data format for a digital signal processing. The reason is that currently-existing digital signal processing techniques are based on an assumption that data is obtained with a fixed cycle under a steady environment. Thus, if this assumption cannot be satisfied due to a case in which the sampling cycle changes in accordance with the vehicle running speed for example, the frequency characteristic cannot be acquired correctly. Due to this reason, the data sampling technique must be improved so that a wheel speed signal can be always obtained at a fixed cycle. At the same time, in a process of calculating (since this process resamples the static wheel speed signal based on once-sampled time information, this conversion process will be called "resampling" hereinafter), from the information obtained at a dynamic cycle, a wheel speed signal having a fixed cycle (hereinafter this will be called "static wheel speed signal" and, when the term "wheel speed signal" or "wheel speed" is simply used hereinafter, the term denotes the "static wheel speed signal"), the wheel speed is desirably calculated correctly by eliminating the influence by noise as much as possible.

By the way, the method of resampling a wheel speed signal can be classified, on the basic principles thereof, into the following two types of: (1) a method of using interpolation to directly calculate a static wheel speed signal; and (2) a method of calculating the number of teeth passed per a sampling cycle to thereby calculate a static wheel speed signal.

Among these methods, the method (1) calculates dynamic wheel speed signals based on the time information to calculate a straight line around which those signals are temporally close to one another to thereby calculate a static wheel speed signal corresponding to the sampling time. Non Patent Literature 1 suggests a method to carry out a linear interpolation using two dynamic wheel speed signals to thereby resample static wheel speed signals (see FIG. 5). In FIG. 5, the dotted line shows each time of 5 ms at which a static wheel speed signal is cut out. The circle mark shows a dynamic wheel speed signal. The diamond mark shows a static wheel speed signal. It has been pointed out that the method of Non Patent Literature 1 has the following two disadvantages.

Firstly, when a cycle at which a dynamic wheel speed signal is obtained is, due to a low-speed running, longer than a sampling cycle, a plurality of wheel speed signals are extracted through a single interpolation. However, these wheel speed signals have thereamong only a simple linear relation, thus losing the tire vibration-related information originally included in the time information.

Secondly, dynamic wheel speed signals used as data for resampling are merely two neighboring points. This means that some obtained information is not used, causing a poor resampling accuracy. Non Patent Literature 1 suggests, as a method that can solve the disadvantage as described above, a method using a low-pass filter and the decimation of a resampled wheel speed signal. However, this method does not provide a fundamental solution to all conditions and also requires a large amount of calculation.

Therefore, this method is not practical. Thus, a method may be considered where this resampling method by the linear interpolation is amplified to increase the number of data points used for the interpolation by the regression line thereof.

In the case of this method however, as the speed is lower, the overlap is caused between the data used for the regression in order to calculate a wheel speed signal at a certain time and the data used for the regression in order to calculate a wheel speed signal at the next time. The regression by the data overlapped in the front-and-rear direction as described above is equivalent to subjecting the time-series data to a moving average processing and requires a low-pass filter having an effect depending on the vehicle speed. Thus, a third disadvantage is newly caused. Particularly under the running conditions having a speed of 40 kilometers or less per hour, the filter effect is strong and a high influence is also caused on the frequency band to which attention is paid for detecting an abnormality, which is not desirable. Furthermore, Non Patent Literature 1 discloses, for example, a method of using a non-linear kernel and a method of using an approximated analog filter. However, any of these methods lacks in the physical basis and also provides a small effect to the required calculation amount and thus is insufficient as a method.

On the other hand, the method (2) calculates, based on the acquired time information, the number of teeth passed per a unit time (sampling cycle set in advance) to calculate the wheel speed based on the relation between the distance (a product of the interval between neighboring teeth and the number of passed teeth) and the time (sampling cycle). This method has been frequently suggested and carried out as the straightest approach. For example, in the case of a Tire Pressure Monitoring System based on the DLR method, in order to calculate the wheel speed signal per 40 milliseconds, the accumulated value of the time information is sequentially calculated and the number of teeth at which the accumulated value is closest to 40 milliseconds is adopted as a distance to the accumulated time. However, in the RFM method, such a simple calculation method cannot be applied due to the two reasons as described below.

Firstly, in the RFM method for monitoring the frequency characteristic close to 40 Hz, the wheel speed signal is desirably obtained with the shortest cycle as possible. Thus, the long sampling cycle of 40 milliseconds is far from satisfying the required performance. Specifically, a sampling cycle of at least 8 milliseconds or shorter is required. Furthermore, when considering the limitation on the ABS calculation resource, the calculation is desirably achieved with the lightest processing as possible.

Secondly, a sufficient accuracy required to acquire the frequency characteristic cannot be secured. Specifically, the number of teeth counted is always an integer and thus the wheel speed is calculated based on the accumulated time of about 40 milliseconds (thus, the sampling cycle is not strictly fixed and thus this method is a method in the intermediate of a method of simply calculating a dynamic wheel speed signal and a method of accurately performing resampling). Thus, in the case of the calculation including such a rough part, the data accuracy is remarkably insufficient in the RFM method that must detect a minute change in the resonance frequency occurring on the order of a few Hz. Furthermore, an influence by an error due to the approximate calculation of the accumulated time increases as the sampling cycle is shorter. In order to solve the first disadvantage, it is not effective to simply reduce the sampling cycle. In order to also solve the second disadvantage, a short cycle must be fixed and the number of teeth passed during the cycle must be calculated strictly. Furthermore, an improvement for reducing white sensing noise is also required.

The resampling method as described above has been recognized as being difficult for application because of the high calculation load. Thus, no detailed examination or development has been performed for the resampling method. Actually, Patent Literature 2 avoids this method due to the high calculation amount and suggests an air pressure alarm apparatus based on another approach.

CITATION LIST

Patent Literature

Patent Literature 1: Specification of Japanese Patent No. 3152151
Patent Literature 2: Specification of Japanese Patent No. 3289384

Non Patent Literature

Non Patent Literature 1: Persson, N., "Event Based Sampling with Application to Spectral Estimation", Ph.D. thesis No. 981, Division of Control and Communication, Department of Electrical Engineering Linkopings University, 2002

SUMMARY OF INVENTION

Technical Problem

The present invention has been made in view of the circumstance as described above. It is an object of the invention to provide, by pursuing an optimal method belonging to the method (2), an apparatus, a method, and a program for detecting rotation speed information by which a wheel speed signal can be accurately calculated under any running conditions. Furthermore, another object of the present invention is to provide an apparatus, a method, and a program for detecting a tire having a decreased pressure by which a resonance frequency can be securely calculated under any running conditions and a tire having a decreased pressure can be accurately detected.

Solution to Problem

A rotation speed information detection apparatus according to a first aspect of the present invention is a rotation speed information detection apparatus, including: a wheel sensor for detecting passage of teeth of a gear provided in association with tires of the respective wheels of a vehicle; a number-of-teeth calculation means for calculating, based on time information as a time required for the teeth of the gear to pass obtained by the wheel sensor, the number of teeth of the gear passed per a sampling cycle set in advance; and a wheel speed calculation means for regularly calculating rotation speed information of the tire with using the number of teeth calculated by the number-of-teeth calculation means, wherein the number-of-teeth calculation means is configured to use, when an accumulated value of the time information at a sampling cycle exceeds the time at which the next sampling cycle is started, a ratio between time information at the point and a remaining time until the time at which the next sampling cycle is started is reached to thereby calculate the number of remaining teeth until the time at which the next sampling cycle is started is reached to calculate the number of teeth passed during the sampling cycle, and wherein the wheel speed calculation means is configured to calculate tire rotation speed information based on an interval between neighboring teeth in the gear, the number of teeth passed during the sampling cycle, the number of remaining teeth calculated by the number-of-teeth calculation means, and the sampling cycle.

In the rotation speed information detection apparatus according to the first aspect, a ratio between the time information at which the sampling time is exceeded and the remaining time until the sampling time is reached is used to obtain the number of remaining teeth. Thus, a simple calculation processing may be used. Furthermore, in contrast with a resampling method based on the linear interpolation, this calculation is free from a defect where the information use efficiency or the filter effect changes depending on the speed for example. Thus, the static wheel speed signal can be always calculated with a fixed performance.

A rotation speed information detection apparatus according to a second aspect of the present invention is characterized in including, instead of the number-of-teeth calculation means of the rotation speed information detection apparatus according to the first aspect, a number-of-teeth calculation means configured to use, when an accumulated value of the time information at a sampling cycle exceeds the time at which the next sampling cycle is started, the ratio between an average time information value and a remaining time until the time at which the next sampling cycle is started is reached, to calculate the number of remaining teeth until the time at which the next sampling cycle is started is reached and to calculate the number of teeth passed during the sampling cycle.

The rotation speed information detection apparatus according to the second aspect of the present invention uses the ratio between the average time information value and the remaining time until the sampling time is reached to thereby obtain the number of remaining teeth. Thus, in addition to the effect by the rotation speed information detection apparatus according to the first aspect, the influence by the measurement error caused when the sensor reads the rising edge of the teeth can be reduced to improve the computation accuracy.

The method of detecting rotation speed information according to a third aspect of the present invention is a method of detecting rotation speed information, including: a detection step of detecting passage of teeth of a gear provided in association with tires of the respective wheels of a vehicle; a number-of-teeth calculation step of calculating, based on time information as a time required for the teeth of the gear to pass obtained by the detection step, the number of teeth of the gear passed per a sampling cycle set in advance; and a wheel speed calculation step of regularly calculating rotation speed information of the tire with using the number of teeth calculated in the number-of-teeth calculation step,
wherein the number-of-teeth calculation step uses, when an accumulated value of the time information at a sampling cycle exceeds the time at which the next sampling cycle is started, a ratio between time information at the point and a remaining time until the time at which the next sampling cycle is started is reached to thereby calculate the number of remaining teeth until the time at which the next sampling cycle is started is reached to calculate the number of teeth passed during the sampling cycle, and
wherein the wheel speed calculation step calculates tire rotation speed information based on an interval between neighboring teeth in the gear, the number of teeth passed during the sampling cycle, the number of remaining teeth calculated in the number-of-teeth calculation step, and the sampling cycle.

The method of detecting rotation speed information according to a fourth aspect of the present invention is characterized in including, instead of the number-of-teeth calculation step of the method of detecting rotation speed information according to the third aspect, a number-of-teeth calculation step of using, when an accumulated value of the time information at a sampling cycle exceeds the time at which the next sampling cycle is started, the ratio between an average time information value and a remaining time until the time at which the next sampling cycle is started is reached, to calculate the number of remaining teeth until the time at which the next sampling cycle is started is reached and of calculating the number of teeth passed during the sampling cycle.

A rotation speed information detection program according to a fifth aspect of the present invention causes, in order to regularly calculate rotation speed information of tires of the respective wheels of a vehicle, a computer to function as: a number-of-teeth calculation means for calculating, based on time information as a time required for the teeth of the gear to pass obtained by a wheel sensor for detecting passage of teeth of a gear provided in association with the tires, the number of teeth of the gear passed per a sampling cycle set in advance; and a wheel speed calculation means for regularly calculating rotation speed information of the tire with using the number of teeth calculated by the number-of-teeth calculation means,
wherein the number-of-teeth calculation means is configured to use, when an accumulated value of the time information at a sampling cycle exceeds the time at which the next sampling cycle is started, a ratio between time information at the point and a remaining time until the time at which the next sampling cycle is started is reached to thereby calculate the number of remaining teeth until the time at which the next sampling cycle is started is reached to calculate the number of teeth passed during the sampling cycle, and
wherein the wheel speed calculation means is configured to calculate tire rotation speed information based on an interval between neighboring teeth in the gear, the number of teeth passed during the sampling cycle, the number of remaining teeth calculated by the number-of-teeth calculation means, and the sampling cycle.

A rotation speed information detection program according to a sixth aspect of the present invention is characterized in causing a computer to function, instead of the number-of-teeth calculation means of the rotation speed information detection program according to the fifth aspect, as a number-of-teeth calculation means configured to use, when an accumulated value of the time information at a sampling cycle exceeds the time at which the next sampling cycle is started, the ratio between an average time information value and a remaining time until the time at which the next sampling cycle is started is reached, to calculate the number of remaining teeth until the time at which the next sampling cycle is started is reached and to calculate the number of teeth passed during the sampling cycle.

Furthermore, an apparatus for detecting a tire having a decreased pressure according to a seventh aspect of the present invention is characterized in including: the rotation speed information detection apparatus according to the first aspect;
a frequency characteristic estimation means for estimating, based on the rotation speed information obtained from the rotation speed information detection apparatus, a frequency characteristic of the rotation speed information; and
a determination means for determining a decrease in the tire air pressure based on the estimated frequency characteristic,
wherein the frequency characteristic estimation means includes a parameter estimation means for estimating parameters of a linear model with regard to a time-series signal including the rotation speed information.

An apparatus for detecting a tire having a decreased pressure according to an eighth aspect of the present invention is characterized in including, instead of the rotation speed information detection apparatus in the apparatus for detecting a tire having a decreased pressure according to the seventh aspect, the rotation speed information detection apparatus according to the second aspect.

A method of detecting a tire having a decreased pressure according to a ninth aspect of the present invention is characterized in including:
the method of detecting rotation speed information according to the third aspect;
a frequency characteristic estimate step for estimating, based on the rotation speed information obtained by the method of detecting rotation speed information, a frequency characteristic of the rotation speed information; and
a determination step of determining a decrease in the tire air pressure based on the estimated frequency characteristic,
wherein the frequency characteristic estimation step includes a parameter estimation step for estimating parameters of a linear model with regard to a time-series signal including the rotation speed information.

A method of detecting a tire having a decreased pressure according to a tenth aspect of the present invention is characterized in including, instead of the method of detecting rotation speed information in the method of detecting a tire having a decreased pressure according to the ninth aspect, the method of detecting rotation speed information according to the fourth aspect.

A program for detecting a tire having a decreased pressure according to an eleventh aspect of the present invention includes the rotation speed information detection program according to the fifth aspect and is characterized in causing, in order to detect a tire having a decreased pressure based on a resonance frequency of a tire of a running vehicle, the computer to further function as: a frequency characteristic estimation means for estimating, based on the rotation speed information, a frequency characteristic of the rotation speed information; and a determination means for determining a decrease in the tire air pressure based on the estimated frequency characteristic, wherein the frequency characteristic estimation means includes a parameter estimation means for estimating parameters of a linear model with regard to a time-series signal including the rotation speed information.

A program for detecting a tire having a decreased pressure according to a twelfth aspect of the present invention is characterized in including, instead of the rotation speed information detection program in the program for detecting a tire having a decreased pressure according to the eleventh aspect, the rotation speed information detection program according to the sixth aspect.

Advantageous Effects of Invention

According to an apparatus, a method, and a program for detecting rotation speed information of the present invention, a wheel speed signal can be accurately calculated under any running conditions. Furthermore, according to an apparatus, a method, and a program for detecting a tire having a decreased pressure of the present invention, a resonance frequency can be securely calculated under any running conditions and a tire having a decreased pressure can be detected accurately.

BRIEF DESCRIPTION OF DRAWINGS

FIG. 11 is a flowchart illustrating the procedure of detecting rotation speed information and detecting a tire having a decreased pressure in accordance with embodiments of the present invention.

DESCRIPTION OF EMBODIMENTS

Hereinafter, with reference to the attached drawings, the following section will describe in detail embodiments of an apparatus, a method, and a program for detecting rotation speed information, and an apparatus, a method, and a program for detecting a tire having a decreased pressure of the present invention.

Figure 1:
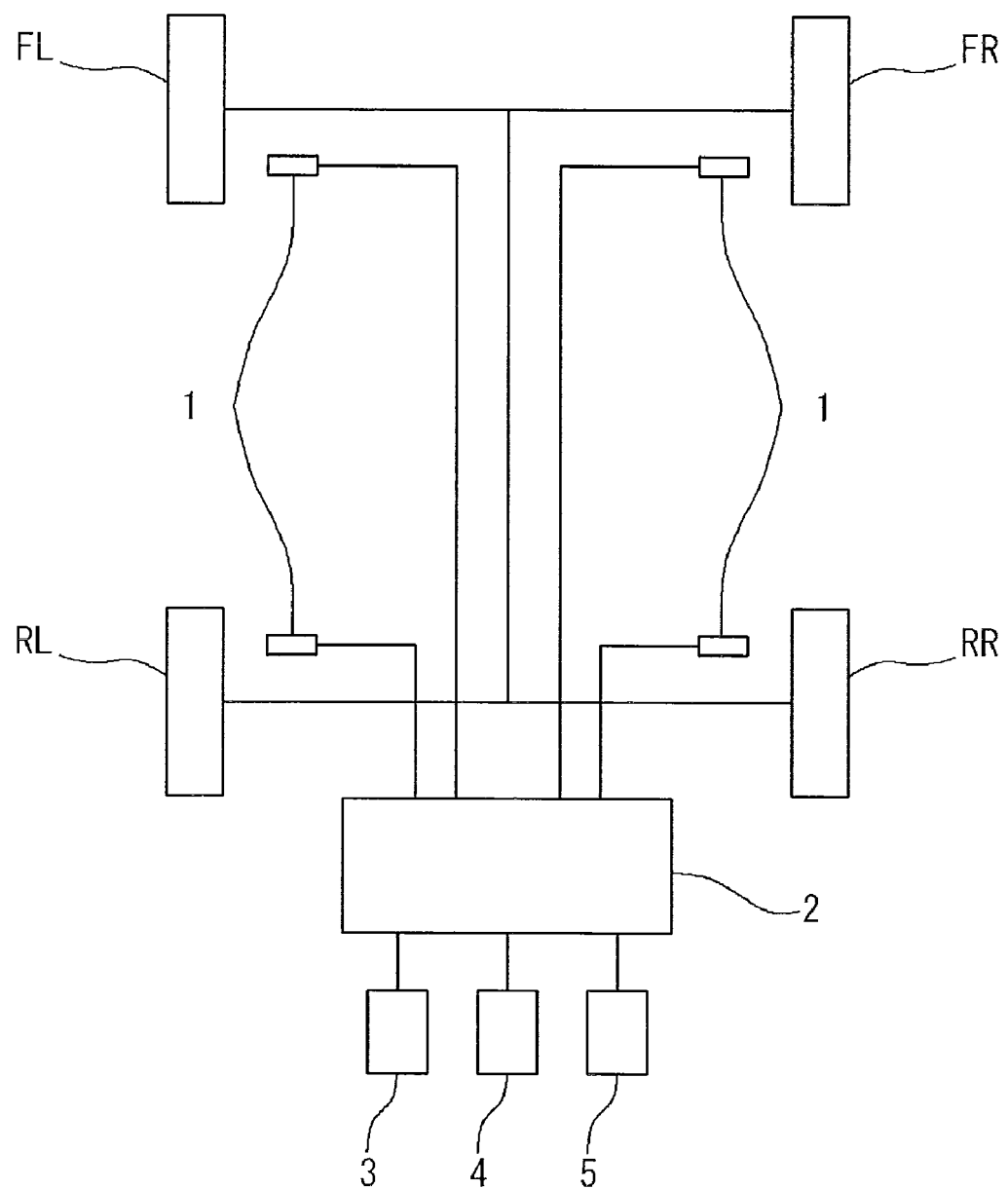
FIG. 1 is a block diagram illustrating one embodiment of an apparatus for detecting a tire having a decreased pressure of the present invention.

As shown in FIG. 1, an apparatus for detecting a tire having a decreased pressure according to one embodiment of the present invention includes, in order to detect the rotation speed information of a left front wheel (FL), a right front wheel (FR), a left rear wheel (RL) and a right rear wheel (RR) of tires provided in a vehicle, a wheel sensor 1 provided in association with the respective tires.

This wheel sensor 1 can be the one that can use the induced voltage to measure a change in the magnetic field emitted from a permanent magnet provided therein that is caused by the rotation of a gear (not shown) provided at a part at which the vehicle is connected to the tires. The output from the wheel sensor 1 is given to a control unit 2 that is a computer such as ABS. This control unit 2 is connected, for example, to a display unit 3 configured by a liquid crystal display element, a plasma display element, CRT or the like for displaying a tire having a decreased pressure, an initialization button 4 that can be operated by a driver, and an alarm unit 5 for notifying a driver of a tire having a decreased pressure.

Figure 2:
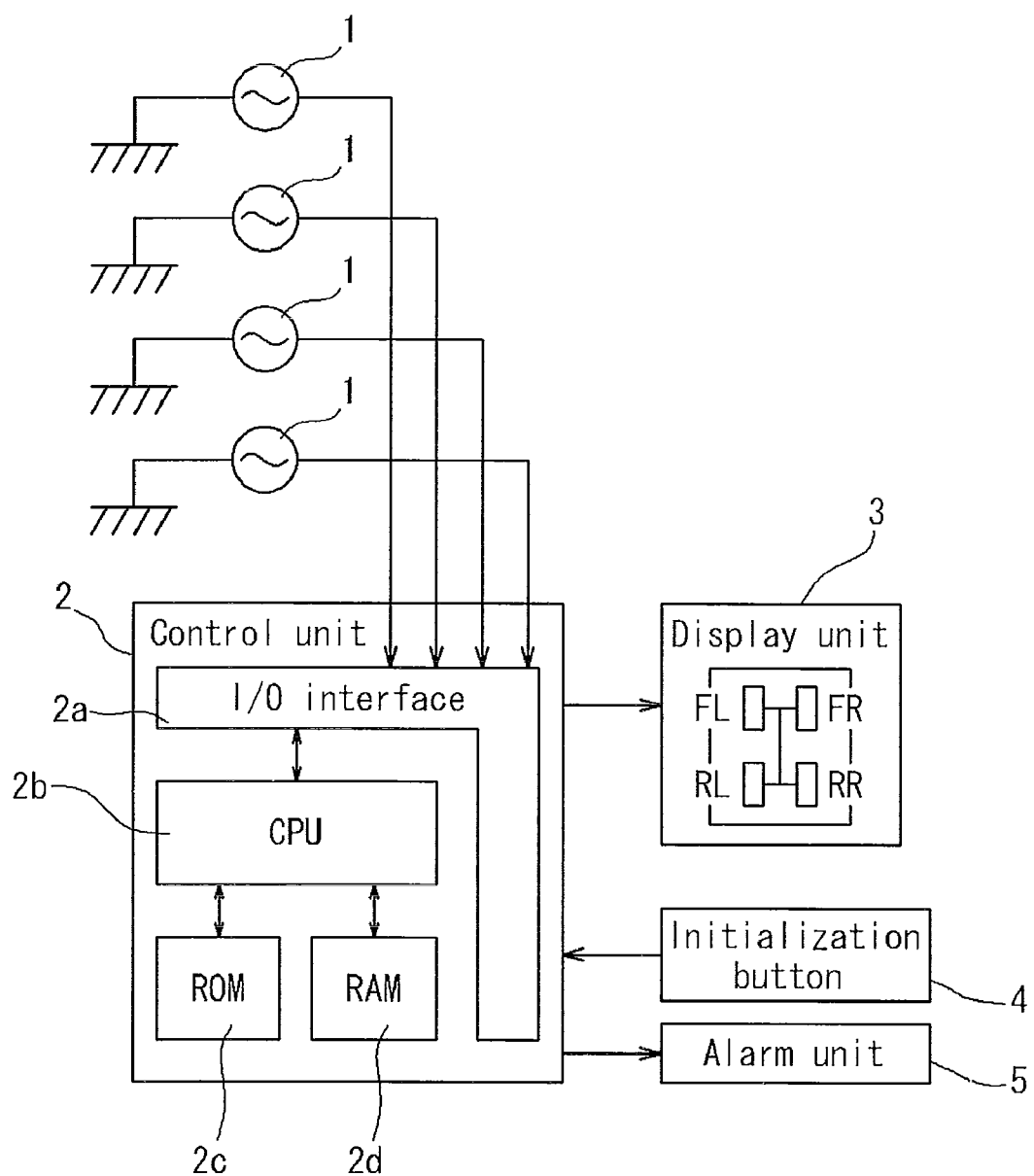
FIG. 2 is a block diagram illustrating the electrical configuration of the apparatus for detecting a tire having a decreased pressure shown in FIG. 1.
Figure 3:
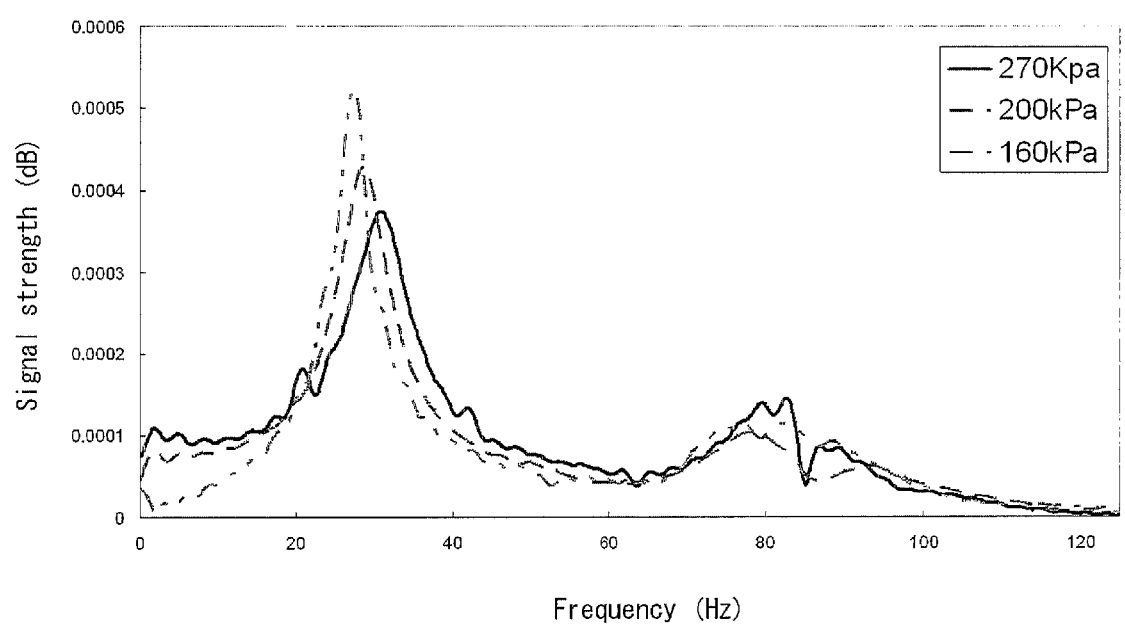
FIG. 3 illustrates the power spectra obtained by subjecting wheel acceleration signals to Fast Fourier Transform.
Figure 4:
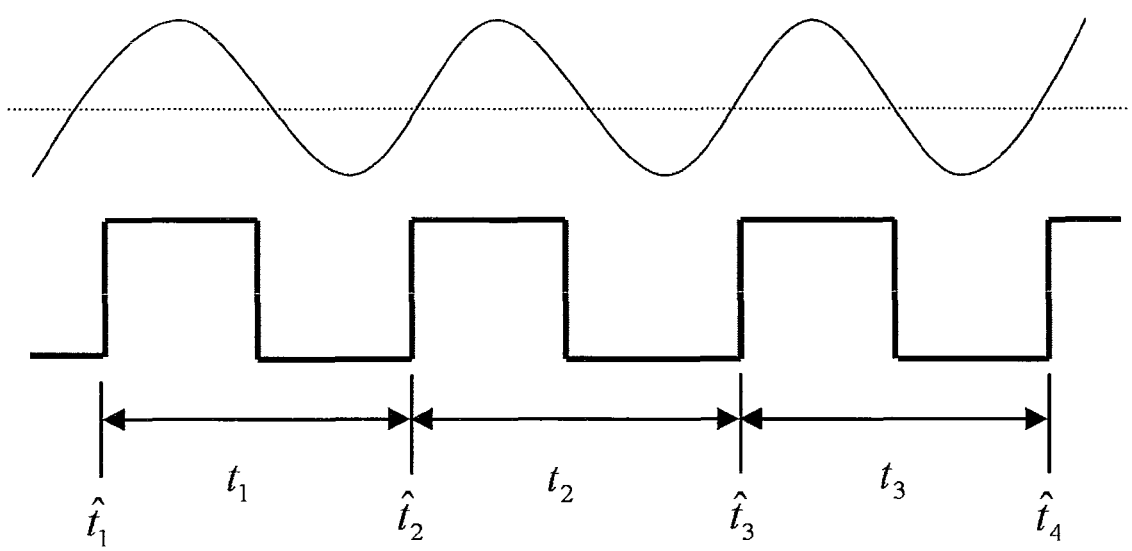
FIG. 4 illustrates that the time at which the rising edges of the respective teeth of the gear pass can be measured.
Figure 5:
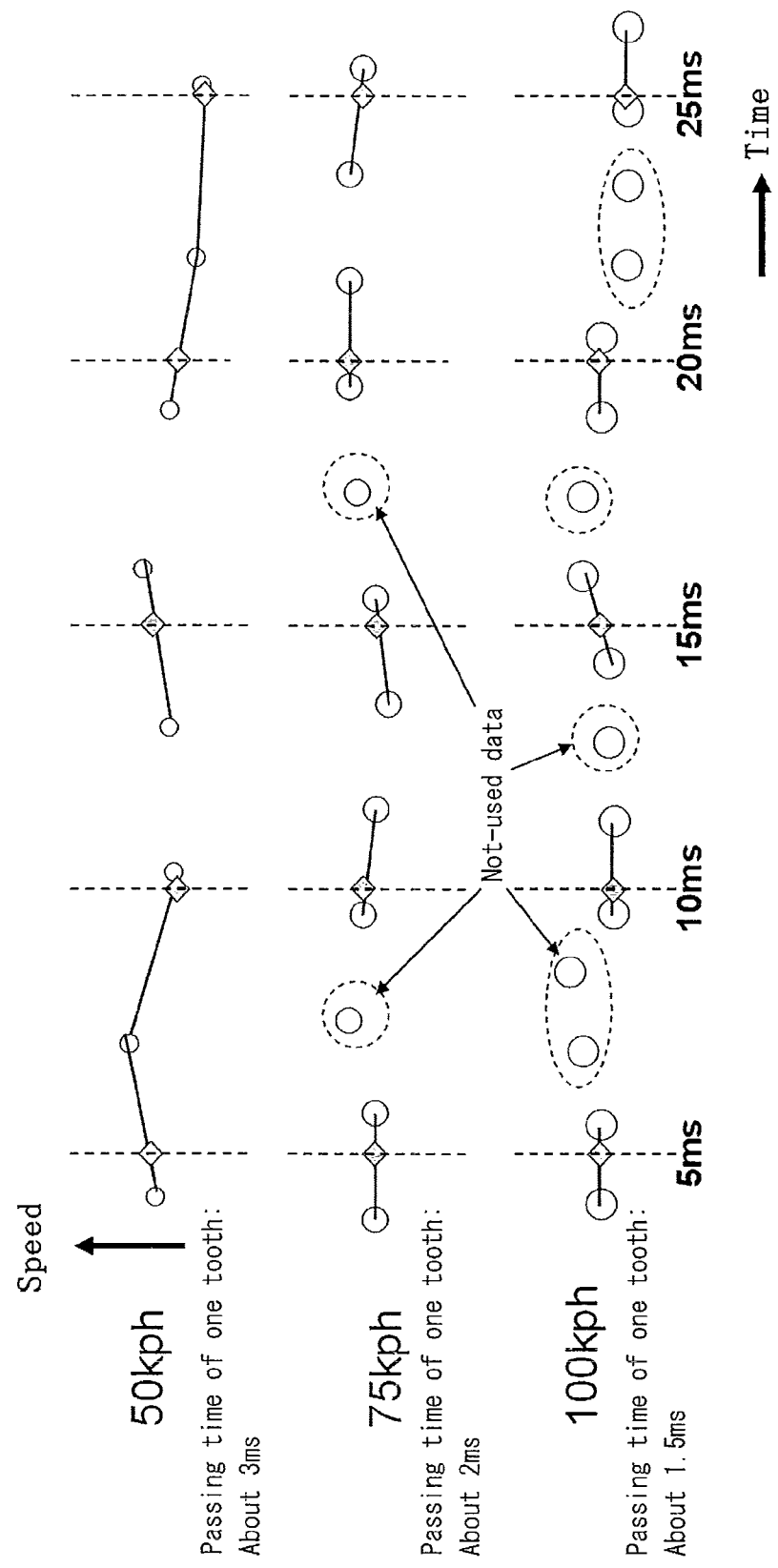
FIG. 5 is a schematic view illustrating the resampling method based on the linear interpolation.

As shown in FIG. 2, the control unit 2 is composed of: an I/O interface 2a required for exchanging signals with an external apparatus; a CPU 2b functioning as a center of the computation processing; a ROM 2c storing therein a control operation program of the CPU 2b; and a RAM 2d in which data is temporarily written and from which the written data is read out when the CPU 2b performs a control operation.

The wheel sensor 1 outputs a dynamic wheel speed signal corresponding to the number of rotations of a tire. Then, the dynamic wheel speed signal can be resampled based on the present invention with a predetermined sampling cycle ΔT (second) (e.g., ΔT=0.005 seconds) to thereby obtain the static wheel speed signal as time-series data. Here, the sampling cycle must be sufficient so that a band in which a resonance frequency of a target tire appears can be observed.

The apparatus for detecting a tire having a decreased pressure according to the present embodiment is mainly composed of: a rotation speed information detection apparatus including the wheel sensor 1, the number-of-teeth calculation means for calculating the number of teeth of the gear passed per a sampling cycle, and the wheel speed calculation means for using the number of teeth calculated by the number-of-teeth calculation means to regularly calculate the rotation speed information of the tire; a frequency characteristic estimation means for estimating a frequency characteristic based on the rotation speed information obtained from the rotation speed information detection apparatus; and a determination means for determining a decrease in the tire air pressure based on the estimated frequency characteristic. The rotation speed information detection program causes the control unit 2 to function as the number-of-teeth calculation means and the wheel speed calculation means. Furthermore, a program for detecting a tire having a decreased pressure causes the control unit 2 to further function as the frequency characteristic estimation means and the determination means.

The frequency characteristic estimation means can be, for example, conventionally-known means including the one disclosed in Patent Literature 1 (the one in which a resonance phenomenon is described by a quadratic model and the sequential time-series analysis is carried out based on an Autoregressive (AR) model. A frequency corresponding to the pole of a transfer function representing the AR model is estimated as a resonance frequency).

Figure 6:
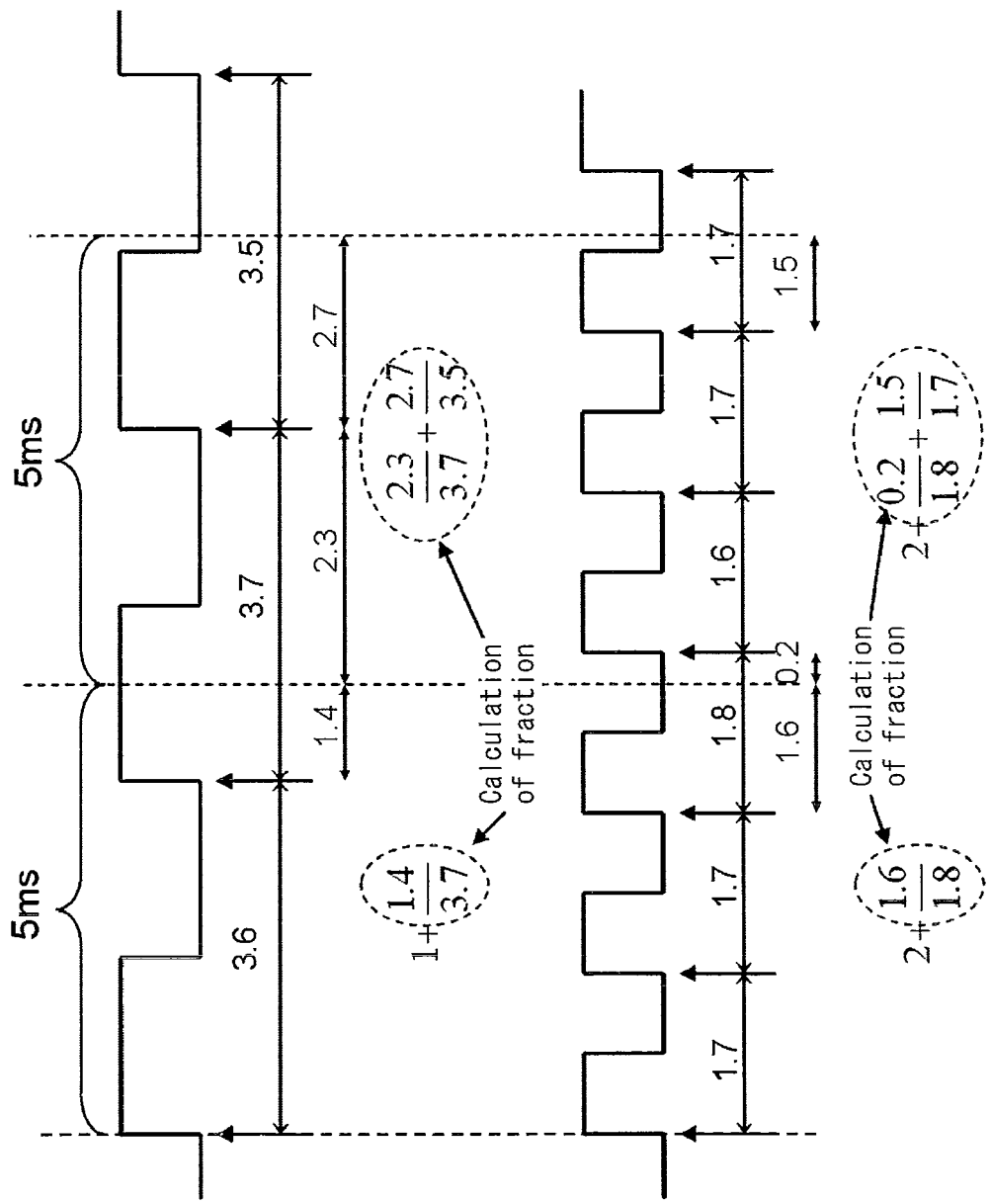
FIG. 6 is a schematic view illustrating the procedure of calculating the number of teeth.

In the method of detecting rotation speed information of the present invention, when the number of teeth of the gear is calculated, the ratio of the time information is calculated to thereby calculate the number of teeth passed at the sampling cycle. Specifically, the accumulated value of the time information is calculated and, when this exceeds the sampling time, the number of remaining teeth must be calculated. This is calculated based on the ratio between the time information and the remaining time until the sampling time is reached. FIG. 6 is a schematic view illustrating the procedure for calculating the number of teeth when the sampling cycle is 5 milliseconds. In FIG. 6, the upper diagram shows a case where the vehicle is running at a low speed and the lower diagram shows a case where the vehicle is running at a high speed. In the case of the upper diagram of FIG. 6 for example, the first time information in the first sampling cycle (S1) is 3.6 milliseconds and the second time information is 3.7 milliseconds. The second time information exceeds the next sampling cycle (S2). Thus, at this point of time, the number of remaining teeth is calculated. The time information exceeding the next sampling cycle (S2) is 3.7 milliseconds. The remaining time until the next sampling cycle (S2) is reached can be calculated as 5−3.6=1.4 milliseconds. Thus, the ratio of the remaining time to the time information at the exceeding point of time is 1.4/3.7≈70.378. Thus, the number of teeth in the first sampling cycle (S1) is 1+0.378=1.378. Here, a general gear teeth pitch is about 4 cm. Thus, a distance of 4×1.378=5.512 cm was traveled during 5 milliseconds. Thus, the wheel speed at the moment is calculated as about 39.69 km per hour. Furthermore, in the calculation of the wheel speed in the next 5 milliseconds, the starting point of reckoning does not correspond to the tooth rising edge. In this case, the first number of remaining teeth is similarly calculated based on the fact that the ratio between second time information of 3.7 millisecond and 3.7−1.4=2.3 millisecond is 2.3/3.7=0.622. For simplicity, the time information in this example had two significant figures. However, the number of significant figures depending on the sensor performance of ABS is used in an actual case. Thus, the wheel speed is calculated on a very minute order.

Hereinafter, the method will be generally described in detail.

It is assumed that the Nth time information $t_N$ is obtained and the accumulated value of the time information up to now exceeds the sampling time nT. Specifically, it is assumed that the formula (1) is established.

$$y_{N-k-1} < (n-1)T \leq y_{N-k} < \ldots < y_{N-1} < nT \leq y_N \quad (1)$$

In the formula, T denotes a sampling cycle and n denotes a natural number.

Then, the number of teeth d passed at the sampling cycle T is calculated by the formula (2) and then static wheel signal $v_s(nT)$ is obtained by the formula (3).

$$d = \frac{y_{N-k} - (n-1)T}{t_{N-k}} + (N-2) + \frac{nT - y_{N-1}}{t_N} \quad (2)$$

$$v_s(nT) = \frac{2\pi r}{M} \cdot \frac{d}{T} \quad (3)$$

In the formula (3), M denotes the number of teeth of the gear and r denotes the gear radius.

The first term of the formula (2) shows the number of remaining teeth passed during a period from time (n−1)T to $y_{N-k}$ when the starting point of reckoning of the number of teeth is indefinite (in other words, when the starting point of reckoning does not correspond to the rising edge). Furthermore, the third term shows the number of teeth passed during $$nT - y_{N-1} = T - \sum_{i=N-k}^{N-1} t_i$$

when a period $t_N$ is required for the Nth tooth to pass. Specifically, the third term means the number of teeth passed during the remaining time until the sampling cycle T is reached.

While the above-described resampling method using a nonlinear kernel and the resampling method using an approximate analog filter require a complicated calculation processing, the present invention can be realized by a simple calculation. Furthermore, in contrast with a resampling method based on the linear interpolation, this calculation is free from a defect where the information use efficiency or the filter effect changes depending on the speed for example. Thus, the static wheel speed signal can be always calculated with a fixed performance. Furthermore, the computation accuracy also can be improved by modifications as shown below.

Figure 7A:
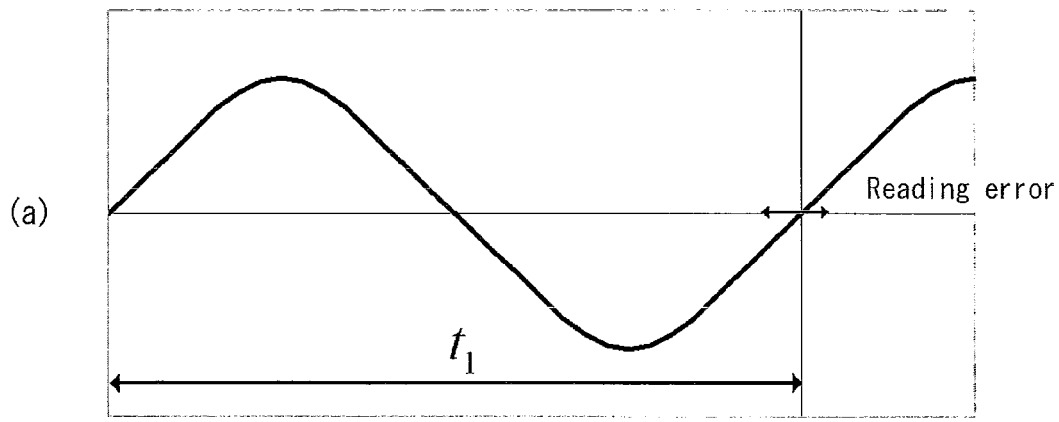
FIGS. 7(a) and 7(b) illustrate that the same level of measurement errors is included regardless of the vehicle speed.
Figure 7B:
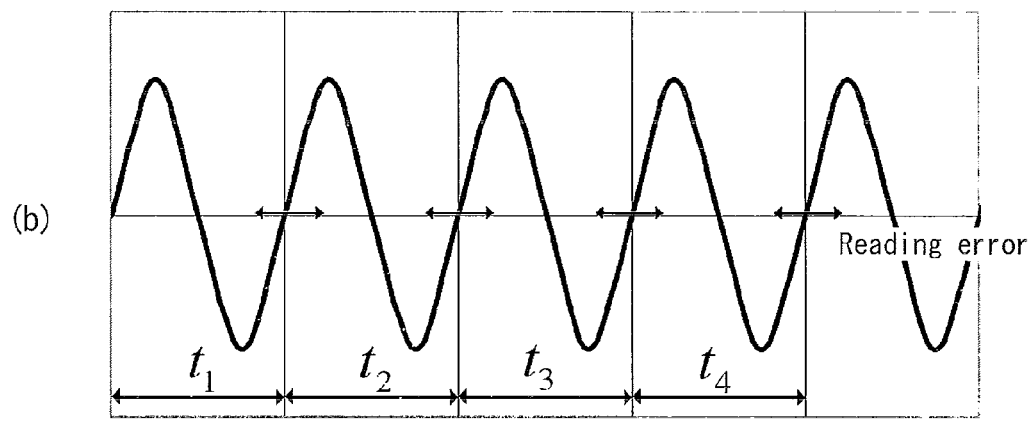

When the wheel sensor 1 reads the tooth rising edge, a measurement error is mixed. FIG. 7(a) shows a case at a low speed and FIG. 7(b) shows a case at a high speed. The magnitude of this error is constant regardless of the speed. Thus, the ratio of the error to the time information is higher as the speed is higher. In the present invention, by adding the time information averaging processing to the above-described resampling procedure, the influence by this error is reduced. Specifically, instead of the formula (2), the number of teeth d passed at the sampling cycle T is calculated by the following formula (4).

$$d = \frac{y_{N-k} - (n-1)T}{\bar{t}} + (N-2) + \frac{nT - y_{N-1}}{\bar{t}} \quad (4)$$

In the formula (4), $\bar{t}$ denotes an average value of the time information $t_{N-k}, \ldots, t_N$. The static wheel speed signal Vs(nT) at this time is obtained by the above-described formula (3). When the starting point of reckoning of the number of teeth is indefinite, the number of the remaining teeth is similarly calculated by the same method (see FIG. 6).

The formula (4) is different from the formula (2) in that the time required for the teeth to pass is assumed as $\bar{t}$, not as $t_{N-k}, t_N$. By using the average $\bar{t}$ of the passing time $t_{N-k}, \ldots, t_N$ of the (N−k)th to Nth teeth, an influence by the sensor noise assumed as white is reduced.

Both of the above-described two resampling methods can stably calculate the static wheel speed signal without being influenced by the vehicle speed. The method of the formula (4) in particular can reduce the influence by randomly-mixed sensor noise to calculate the wheel speed more accurately. FIG. 11 is a flowchart illustrating the procedure of detecting the rotation speed information and the detecting a tire having a decreased pressure in accordance with the two embodiments.

Next, an example of the method of detecting rotation speed information of the present invention will be described. However, the present invention is not limited to such an example only.

Example and Comparative Example

A vehicle including a gear having the number of teeth of 48 was subjected to a running experiment to thereby obtain wheel speed signals. The vehicle was attached with run-flat tires and was caused to run on a paved asphalt road with speeds of 55 km per hour, 75 km per hour, and 95 km per hour. Based on the resultant time stamp data, wheel speed signals (sampling cycle was 5 milliseconds) were obtained by the following methods of Examples 1 and 2 as well as Comparative Examples 1 to 3.

Example 1 the resampling method of the present invention (based on the formula (2))

Example 2 the resampling method of the present invention (based on the formula (4))

Comparative Example 1 the linear interpolation-based resampling method (data score=2)

Comparative Example 2 the linear interpolation-based resampling method (data score=4)

Comparative Example 3 the linear interpolation-based resampling method (data score=8)

The respective resampling methods were evaluated based on the procedure as shown below.
(1) Based on the time stamp data obtained from the actual vehicle experiment, the respective methods are used to obtain wheel speed signals (sampling cycle of 4 milliseconds).
(2) The difference between the signals is calculated to thereby obtain a wheel acceleration signal.
(3) This wheel acceleration signal is subjected to FFT analysis to compare spectra.

Although the calculated wheel speed signal can be directly analyzed as time-series data, since the acceleration has a smaller change than that of the speed, the use of the wheel acceleration signal is desirable from the viewpoint of improvement of the computation accuracy. Thus, the wheel speed signal is converted by the procedure 2. Furthermore, since the quality of the calculated wheel speed signal itself cannot be directly evaluated, the procedure 3 is used to compare the spectrum shapes. The original objective of the present invention is to obtain time-series data having a fixed cycle required to correctly perform a frequency analysis, thus causing no problem in evaluation. The time stamp data used was obtained by causing the vehicle attached with normal tires to run on a paved asphalt road or a concrete road with speeds of 50 km per hour, 75 km per hour, and 100 km per hour. Furthermore, the resonance frequencies of the tires used are known to exist in the vicinity of about 42 Hz from various experiments and empirical rules. A resampling method using a nonlinear kernel and a resampling method using an approximate analog filter require a heavy calculation and cannot be implemented by the actual vehicle calculator and thus are not compared.

Figure 8:
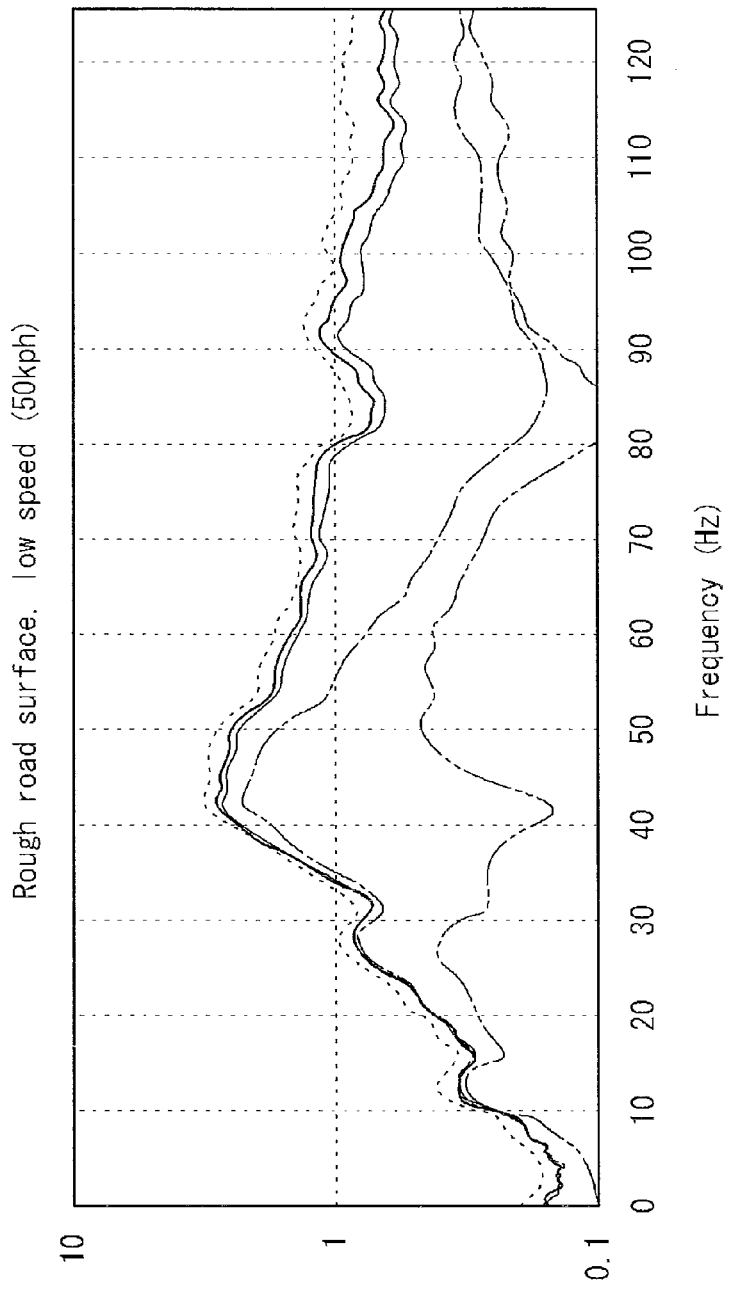
FIG. 8 illustrates the spectra when the time stamp data of a speed of 50 km per hour is subjected to the resampling method based on a linear interpolation and the resampling method according to the present invention.
Figure 9:
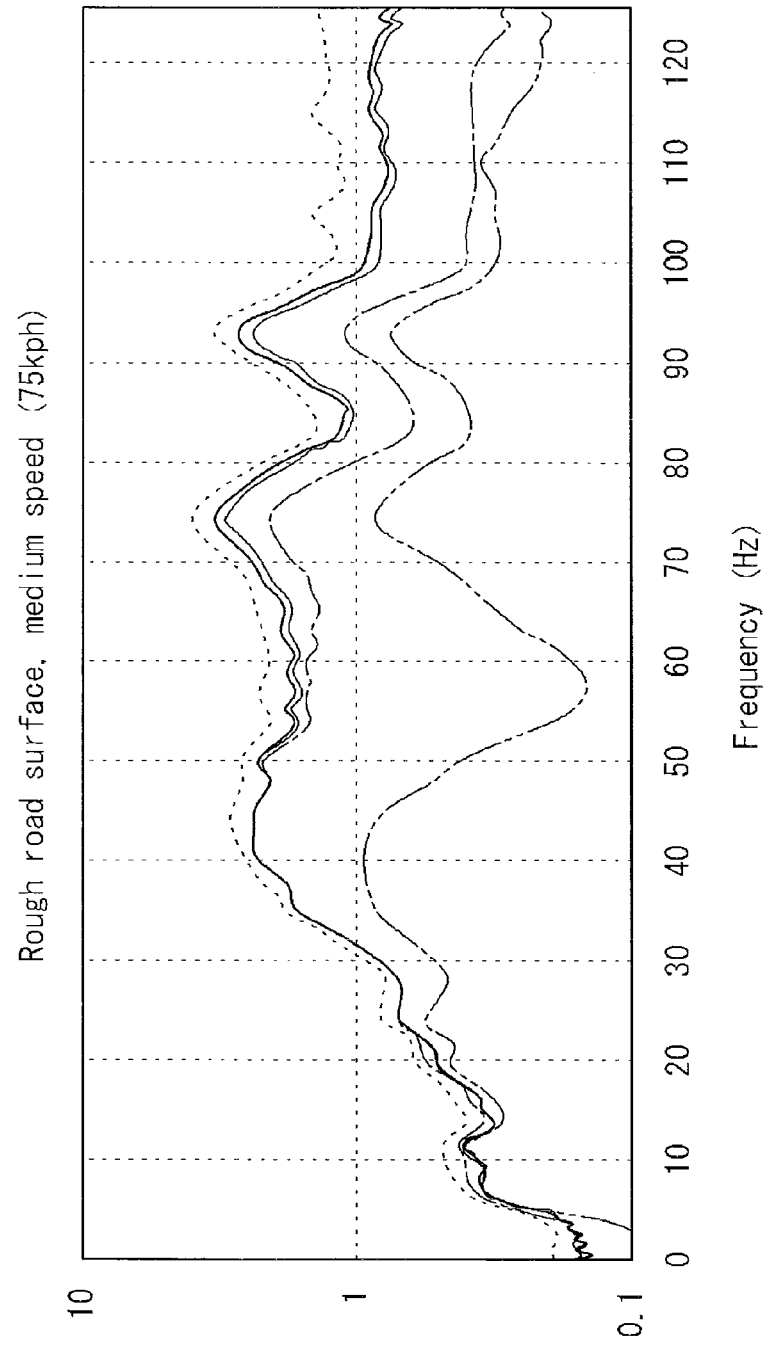
FIG. 9 illustrates the spectra when the time stamp data of a speed of 75 km per hour is subjected to the resampling method based on a linear interpolation and the resampling method according to the present invention.
Figure 10:
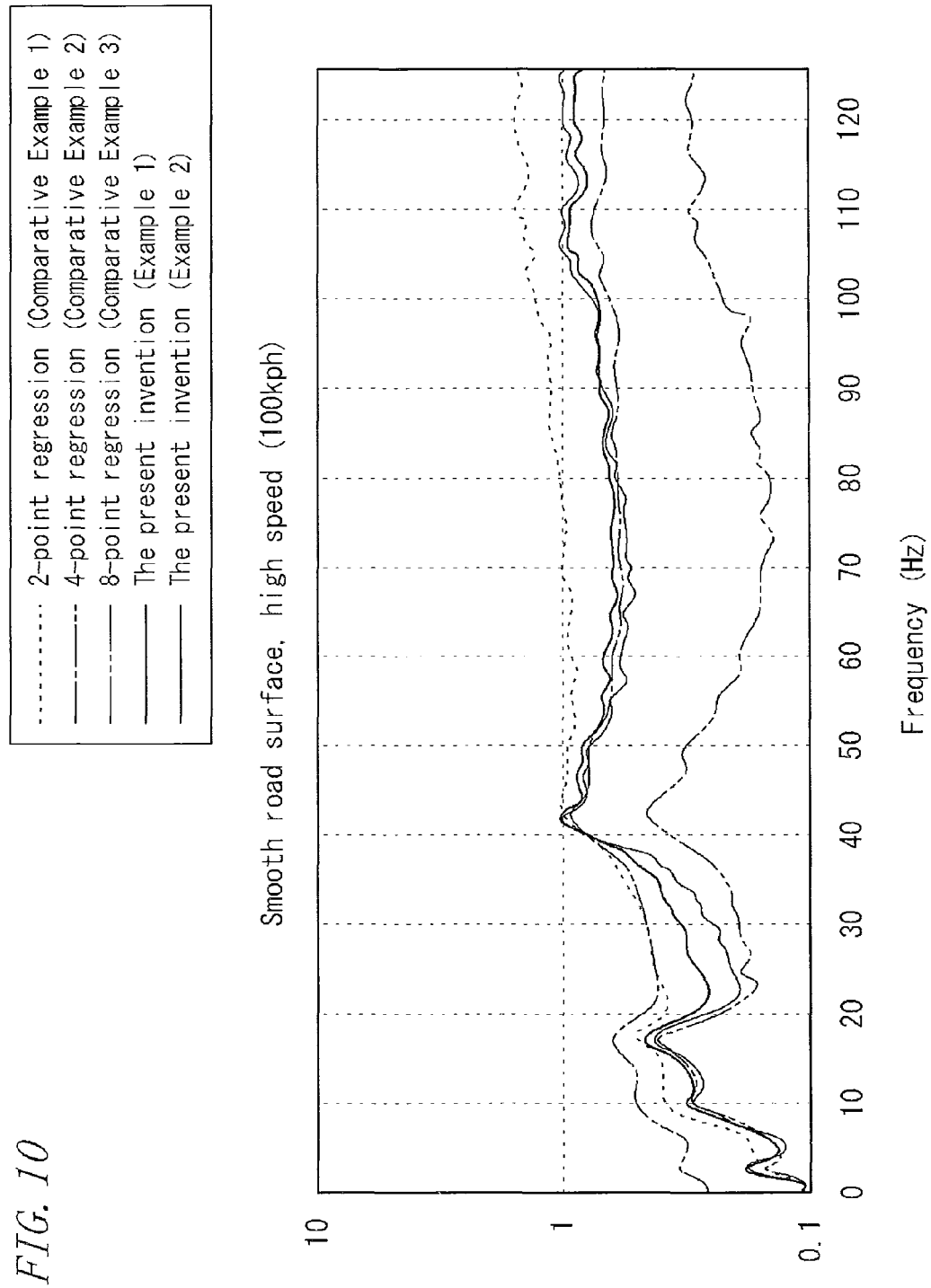
FIG. 10 illustrates the spectra when the time stamp data of a speed of 100 km per hour is subjected to the resampling method based on a linear interpolation and the resampling method according to the present invention.

FIGS. 8 to 10 illustrate the spectra when the time stamp data at the respective speeds of 50 km per hour, 75 km per hour, and 100 km per hour are subjected to the resampling method based on linear interpolation and the resampling method based on the present invention.

In the linear interpolation-based resampling method, when the data score for interpolation is 2 (Comparison Example 1), substantially no resonance peak is found in any of the speeds. In the case of the high speed running (100 km per hour) in particular, the spectrum shape is almost flat toward the higher frequency side, thus, it cannot be considered that significant information regarding a resonance phenomenon exists. The reason is presumably that, as described above, much of the information is not acquired. On the other hand, when the data score is 8, the spectrum peculiarly deforms at a low speed running (50 km per hour) in particular. The reason is that, as described above, the effect by the low-pass filter appears. As a result, the deformation appears in the vicinity of the resonance frequency (42 Hz), thus hindering the detection of abnormality. Only the case of the data score of 4 (Comparative Example 2) shows a favorable result in the scope within which this experiment is performed. However, the result of this experiment merely shows that the effect by the low-pass filter contingently and conveniently appears in these speed ranges. Thus, the spectrum cannot be appropriately obtained in a lower speed range. Actually, the high-frequency component already significantly declines in the case of 50 km per hour, showing that this speed is a lower-limit speed at which the resonance frequency can be observed appropriately. In view of that a fixed-level performance is stably required under any conditions, the change of the spectrum property depending on the speed as described above is not desirable.

On the other hand, with regard to the spectrum when the present invention is used, when the method based on the formula (2) is compared with the method based on the formula (4), the latter has a tendency where an influence by unnecessary low-frequency components is reduced in a high speed region and the resonance peak is clear. The clearness level has no significant difference from a case where the resampling method based on the linear interpolation (data score of 4) is used in a low speed region and a medium speed region. However, it is advantageous that the simple calculation reduces the calculation load and the spectrum does not deform because of the effect of the low-pass filter depending on the running conditions.

[Accuracy of Estimation of Resonance Frequency]

The resampled wheel speed was subjected to the resonance frequency estimation based on the method according to Japanese Patent Application No. 2008-129055 previously suggested by the present applicant, the analysis result of which is shown in Table 1. In the case of the linear interpolation at the data number of 8 (Comparative Example 3), the spectrum significantly deforms as shown above and thus the resonance frequency having a reasonable value cannot be estimated. Thus, this case is not described.

[Method of Estimating Resonance Frequency]

The resonance frequency was estimated by subjecting a time-series signal including rotation acceleration information to the first step of estimating parameters of a tertiary or more time-series model, the second step for estimating, based on the estimated time-series model and the rotation acceleration information, an input signal to the model, the third step of identifying, based on the estimated input signal and the rotation acceleration information, a second order system identification model, and the fourth step of estimating, based on the second order system identification model, the resonance frequency in the tire torsional direction.

More particularly, the first step firstly assumes a wheel acceleration signal as time-series data to estimate the parameters of a time-series model shown in the following formula (5).

$$y(k) = \sum_{i=1}^{n} a_i y(k-i) + w(k) \quad (5)$$

In the formula (5), y(k) denotes a wheel rotation acceleration, n denotes a model order (an integer of 3 or more), a denotes a model parameter, and w(k) denotes white noise. The parameters were estimated by the iterative least squares technique (Kalman filter).

Next, the second step used the estimated time-series model as an inverse filter to thereby estimate the original input signal based on the wheel acceleration signal. Specifically, since the white disturbance w(k) sent from the road surface to the tires is an input to the system, this was estimated based on the time-series model estimated by the previous step and by the following formula (6).

$$w(k) = y(k) - \sum_{i=1}^{n} a_i y(k-i) \quad (6)$$

Next, the third step used the estimated w(k) and the wheel acceleration y(k) as an output signal to thereby identify the second order system. In this step, a filter processing having as a passband a frequency band in which the resonance peak appears was applied to both signals.

Finally, based on the identified second order system, the resonance frequency was calculated. This calculation can be analytically performed by a known method.

TABLE 1

|  | Speed of 50 km per hour | Speed of 75 km per hour | Speed of 100 km per hour |
|---|---|---|---|
| Example 1 (formula (2)) | 42.1 ± 1.1 | 41.8 ± 0.8 | 41.7 ± 1.3 |
| Example 2 (formula (4)) | 42.2 ± 0.7 | 42.3 ± 0.7 | 42.7 ± 0.9 |
| Comparison Example 1 (linear interpolation, data number: 2) | 41.2 ± 1.2 | 43.8 ± 1.4 | 45.2 ± 1.8 |
| Comparison Example 2 (linear interpolation, data number: 4) | 42.2 ± 0.8 | 41.5 ± 0.9 | 42.7 ± 1.2 |

First, when the data number is 2 in the resampling method based on the linear interpolation (Comparative Example 1), it is clear that the resonance frequency having an appropriate value (42 Hz) could not be estimated. This is due to that no resonance peak appears in the spectrum. The substantial cause is that this method cannot efficiently extract the information originally included in the time stamp. The other methods show no significant difference (the present invention based on the formula (4) shows a slightly-small estimate dispersion). However, according to the present invention, the wheel speed can be calculated with a light calculation without deforming the spectrum.

Although the present invention calculates the number of remaining teeth using the time information, in order to calculate the number of remaining teeth only based on the time information, the only method is to calculate, as in the present invention, the ratio between pieces of time information over the sampling time. Although there is a possibility where a sensor for detecting the number of remaining teeth for example is used to obtain a required distance, this is not realistic from the viewpoints of required cost and technique. Thus, the present invention for calculating the distance only based on the information obtained from an existing facility is considered to be the simplest method. Furthermore, although the linear relation between the distance and the time is assumed in order to calculate the ratio (i.e., it is assumed that the vehicle is at a constant speed when the number of remaining teeth is calculated), even when the vehicle accelerates, there is no problem in calculation accuracy if assuming that the vehicle is at a constant speed when one tooth passes momentarily.

Furthermore, although the example assumed that the gear had the number of teeth of 48, the present invention can be applied to any number of teeth. In this case, the higher the number of teeth is, the higher the time information obtained per a unit time is. Thus, the resampling accuracy is improved. The conventional method using the linear regression has a poor data use efficiency and thus does not improve the accuracy even with an increased number of teeth.

What is claimed:

1. An apparatus detecting information of a tire of a vehicle, including: a wheel sensor for detecting passage of teeth of a gear provided in association with tires of the respective wheels of a vehicle; a number-of-teeth calculation device calculating, based on time information as a time required for the teeth of the gear to pass obtained by the wheel sensor, the number of teeth of the gear passed per a sampling cycle set in advance; and a wheel speed calculation device regularly calculating rotation speed information of the tire with using the number of teeth calculated by the number-of-teeth calculation device, wherein the number-of-teeth calculation device uses, when an accumulated value of the time information at a sampling cycle exceeds the time at which the next sampling cycle is started, a ratio between time information at the point and a remaining time until the time at which the next sampling cycle is started is reached, thereby calculating the number of remaining teeth until the time at which the next sampling cycle is started is reached and calculating the number of teeth passed during the sampling cycle, and wherein the wheel speed calculation device calculates tire rotation speed information based on an interval between neighboring teeth in the gear, the number of teeth passed during the sampling cycle, the number of remaining teeth calculated by the number-of-teeth-calculation device, and the sampling cycle.

2. The apparatus of claim 1, further comprising:

a frequency characteristic estimation device estimating, based on the rotation speed information obtained from the wheel speed calculation device, a frequency characteristic of the rotation speed information; and a determination device determining a decrease in the tire air pressure based on the estimated frequency characteristic, wherein the frequency characteristic estimation device includes a parameter estimation device estimating parameters of a linear model with regard to a time-series signal including the rotation speed information.

3. An apparatus of detecting information of a tire of a vehicle, including: a wheel sensor for detecting passage of teeth of a gear provided in association with tires of the respective wheels of a vehicle; a number-of-teeth calculation device calculating, based on time information as a time required for the teeth of the gear to pass obtained by the wheel sensor, the number of teeth of the gear passed per a sampling cycle set in advance; and a wheel speed calculation device regularly calculating rotation speed information of the tire with using the number of teeth calculated by the number-of-teeth calculation device, wherein the number-of-teeth calculation device uses, when an accumulated value of the time information at a sampling cycle exceeds the time at which the next sampling cycle is started, the ratio between an average time information value and a remaining time until the time at which the next sampling cycle is started is reached, thereby calculating the number of remaining teeth until the time at which the next sampling cycle is started is reached and calculating the number of teeth passed during the sampling cycle, and wherein the wheel speed calculation device calculates tire rotation speed information based on an interval between neighboring teeth in the gear, the number of teeth passed during the sampling cycle, the number of remaining teeth calculated by the number-of-teeth-calculation device, and the sampling cycle.

4. The apparatus of claim 3, further comprising:

a frequency characteristic estimation device estimating, based on the rotation speed information obtained from the wheel speed calculation device, a frequency characteristic of the rotation speed information; and a determination device determining a decrease in the tire air pressure based on the estimated frequency characteristic, wherein the frequency characteristic estimation device includes a parameter estimation device estimating parameters of a linear model with regard to a time-series signal including the rotation speed information.

5. A method of detecting information of a tire of a vehicle, including: a detection step of detecting passage of teeth of a gear provided in association with tires of the respective wheels of a vehicle; a number-of-teeth calculation step of calculating, based on time information as a time required for the teeth of the gear to pass obtained by the detection step, the number of teeth of the gear passed per a sampling cycle set in advance; and a wheel speed calculation step of regularly calculating rotation speed information of the tire with using the number of teeth calculated in the number-of-teeth calculation step, wherein the-number-of teeth calculation step uses, when an accumulated value of the time information at a sampling cycle exceeds the time at which the next sampling cycle is started, a ratio between time information at the point and a remaining time until the time at which the next sampling cycle is started is reached, thereby calculating the number of remaining teeth until the time at which the next sampling cycle is started is reached and calculating the number of teeth passed during the sampling cycle, and wherein the wheel speed calculation step calculates tire rotation speed information based on an interval between neighboring teeth in the gear, the number of teeth passed during the sampling cycle, the number of remaining teeth calculated in the number-of-teeth calculation step, and the sampling cycle.

6. The method of claim 5, further comprising:

a frequency characteristic estimate step of estimating, based on the rotation speed information obtained by the wheel speed calculation step, a frequency characteristic of the rotation speed information; and a determination step of determining a decrease in the tire air pressure based on the estimated frequency characteristic, wherein the frequency characteristic estimation step includes a parameter estimation step of estimating parameters of a linear model with regard to a time-series signal including the rotation speed information.

7. A method of detecting information of a tire of a vehicle, including: a detection step of detecting passage of teeth of a gear provided in association with tires of the respective wheels of a vehicle; a number-of-teeth calculation step of calculating, based on time information as a time required for the teeth of the gear to pass obtained by the detection step, the number of teeth of the gear passed per a sampling cycle set in advance; and a wheel speed calculation step of regularly calculating rotation speed information of the tire with using the number of teeth calculated in the number-of-teeth calculation step, wherein the number-of-teeth calculation step uses, when an accumulated value of the time information at a sampling cycle exceeds the time at which the next sampling cycle is started, the ratio between an average time information value and a remaining time until the time at which the next sampling cycle is started is reached, thereby calculating the number of remaining teeth until the time at which the next sampling cycle is started is reached and calculating the number of teeth passed during the sampling cycle, and wherein the wheel speed calculation step calculates tire rotation speed information based on an interval between neighboring teeth in the gear, the number of teeth passed during the sampling cycle, the number of remaining teeth calculated in the number-of-teeth calculation step, and the sampling cycle.

8. The method of claim 7, further comprising:

a frequency characteristic estimate step of estimating, based on the rotation speed information obtained by the wheel speed calculation step, a frequency characteristic of the rotation speed information; and a determination step of determining a decrease in the tire air pressure based on the estimated frequency characteristic, wherein the frequency characteristic estimation step includes a parameter estimation step of estimating parameters of a linear model with regard to a time-series signal including the rotation speed information.

* * * * *